United States Patent Office 2,744,014
Patented May 1, 1956

2,744,014

PROCESS OF SEPARATING PROTEINS AND VITAMINS FROM STARCH WASTE WATER

Lucien H. Greathouse, Burns Ashby Smith, Helen M. Robinson, and Chester H. Haydel, New Orleans, La., assignors to the United States of America as represented by the Secretary of Agriculture No Drawing. Application August 26, 1952,
Serial No. 306,517

1 Claim. (Cl. 99—2)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the manufacture of fine grain starches, particularly applicable to those processes for the production of starch from sweetpotatoes in which the wet milling is conducted in an alkaline solution and provides an improved continuous process for coagulating the components of the waste waters and separating the components, so that a clear effluent substantially free of colloidal matter remains, thus reducing stream pollution problems. In its application to the effluents from alkaline solution milled sweetpotatoes, the invention provides, in addition, an improved process for the recovery of proteins and vitamins.

While "root starches," and particularly sweetpotato starch, are known to have certain unique properties making them more useful than other starches in many industrial processes, the growth of a sweetpotato starch industry has not been rapid. However U. S. Patent 2,443,897 describes a mechanized continuous process for the production of starch of exceptional quality from sweetpotatoes. While in "Food Industries" vol. 17, pages 765, 862, and 866 it is reported that a recovery of even less than half (46%) of the carotene in sweetpotatoes has interesting possibilities, the article also states that "The problem of separation and recovery of the fruit water coagulum on a plant scale is not a simple one."

In contrast to the coarse grained starches obtained from white potatoes, the fine grained starches obtained from corn, sweetpotatoes, rice, and the like settle slowly and because of their more minute particle size form more persistent suspensions. The presence of suspended starch which will disperse when heated adds to the difficulties of separating the fruit water coagulum from a source of fine grain starch.

By the application of a correlated series of particular operations and conditions corn starch fruit water coagulum can be continuously separated to have an effluent substantially free of colloidal matter. Sweetpotato fruit water coagulum can be separated in accordance with this invention with the removal and recovery of at least 60% of the protein and at least 70% of the carotene contained in the sweetpotatoes used.

In order to so separate an effluent fruit water from a source of fine grain starch in accordance with the invention the residual starch content is lowered to less than about 0.2% of the weight of the fruit water. The calcium ion content is adjusted (if not already at that level) to at least 0.01 molar, and the pH of the fruit water is substantially uniformly adjusted by adding acid to approximately the point of least solubility of the proteins present. The resulting mixture is heated to from 75 to 100° C., and allowed to coagulate at that temperature. The formed coagulum is separated preferably without vigorous agitation and initially dewatered without the application of excessive force.

When treated in the above manner the colloidal components coagulate to sharply defined particles in clear non-viscous fruit water from which they will settle rapidly to a small portion of the total volume. The bulk of the fruit water can be removed by decantation. The particles, containing valuable by-products in the case of the sweet-potato fruit waters, can be concentrated primarily by settling so that the use of the more expensive methods of filtering or centrifuging can be reduced to a minimum. By maintaining steady flows and avoiding convection currents during the settling step, the process can be conducted as a continuous operation. In such operation the settling is preferably conducted in an insulated tank with a conical bottom. The concentrated slurry is withdrawn from the bottom of the cone and the fruit water is withdrawn through a floating port on the upper surface.

The residual starch content is preferably lowered to less than about 0.2% of the weight of the fruit water. Higher contents of starch tend to provide suspensions which develop an increased viscosity due to the gelatinization of the starch. Particularly in the case of the sweetpotato starch effluents the residual starch is preferably removed by settling any that will separate within 30 minutes to an hour, but not long enough to permit fermentation to start, followed by passage through a centrifuge of sufficient force to remove final traces.

Particularly in the manufacture of sweetpotato starch, calcium ions are generally introduced in the form of calcium hydroxide during the starch recovery operations and pass into the effluents in a suitable concentration. From 0.01 to 0.02 molar is the preferred calcium ion concentration and where necessary the concentration can suitably be raised by the addition of calcium chloride or any water-soluble salt of calcium.

The pH of the solution must be adjusted smoothly to the desired point with the avoidance of local high concentrations of acid. To this end the solution is stirred evenly at the point of addition of the chemicals. However, no stirring or pumping should be of such speed or so creative of turbulence as to break the original curds formed in the coagulation. The process is preferably conducted by the addition of acid to adjust the pH of the solution to that at which the proteins present are the least soluble. The addition of acid is preferably accomplished by the use of relatively dilute aqueous solutions. For example, the addition of from about 2 to 3 normal aqueous solutions is a particularly suitable method of adding acid. In any individual case, the pH at which the proteins are least soluble can readily be determined by slowly varying the pH of samples of the solution and noting the pH which yields the precipitate containing the highest proportion of the nitrogen.

The preferred method of transferring the mixture from the vessel in which the pH is adjusted to the settling tank is by allowing the mixture to flow due to gravity in order to avoid breaking the curds which have formed.

The following example is presented to illustrate in greater detail certain features included in the practice of the invention.

The starch was removed from twenty-five hundred kilograms of Porto Rico variety sweetpotatoes by the process described by Dexter and Thurber in U. S. Patent 2,443,897. The potatoes contained by analyses 5.732 kg. of nitrogen corresponding to about 36 kg. of protein if all present in such compounds, and 119 g. of carotene essentially all in the beta form. They were ground or rasped with 2–3 times their weight of process water which contained calcium hydroxide of sufficient concentration to yield a slurry with a pH of about 9. This slurry was delivered first to a large continuous centrifuge of the type known as a "protein water separator" in the white potato starch industry.

The centrifuge corresponds to that numbered "13" in the flow sheet of U. S. Patent 2,443,897. The waste waters discharged therefrom by line "25" of that flow sheet are, in their starch manufacturing process, rejected without recovery of any constituent.

The proteins and carotene were coagulated from these waste fruit waters by the following method. The effluent was allowed to stand in a suitable tank until most of any residual suspended starch had settled. The partly clarified fruit water was drawn through a floating port, and fed through the bowl of an imperforate basket centrifuge where traces of starch were removed until the starch content was less than 0.2% of the weight of the fruit water. The effluent freed of starch ran through continuously, except when interrupted to empty the centrifuge basket, and was pumped to a constant head tank which in turn delivered it to a control valve operated by a suitable pH controller of the automatic type. A rotameter following the control valve showed the rate of effluent delivery to the mixing tank. 2.5 normal hydrochloric acid was added to the mixing tank. The acid was delivered through a control valve which was also operated by the pH controller. The acid then passed through a rotameter and into the mixing tank through a series of openings situated along the effluent stream in a tube made of a suitable material to withstand the acid. Adding the acid into the liquor this way, avoids local excesses which would defeat the purpose of obtaining a coagulate of large and fairly even sized curd fragments. The fruit water was stirred slowly to avoid breaking these curds, and after the hydrogen ion content was adjusted to pH of 3.8 it passed to a heating tank. Heat was supplied through automatic controls to elements of sufficient surface so that with sufficient stirring of the liquor local overheating of more than a few degrees was avoided. The fruit water entered this vessel in a continuous flow and discharged in the same way. The rate of flow and heat supply was adjusted to maintain a constant temperature of 80° C. and to give an essentially uniform retention time of 20 minutes in this vessel. The discharge passed into a settling tank. After settling, the clear fruit water was drawn off the top by a floating discharge port and discarded. The settled protein slurry was further thickened by filtering on a gravity filter and then thickened to a paste or cake on a vacuum filter. The final paste so produced was incorporated into stock feeds as a valuable supplement supplying protein, and carotene (also designated as pro-vitamin A).

Better than 60% of the protein and 70% of the carotene in the original sweet potatoes were retained in the final filter cake.

Having thus described our invention, we claim:

A process for recovering proteins and vitamins from the waste fruit water from the manufacture of sweet potato starch, which process comprises: lowering the residual starch content of the waste fruit water to less than about 0.2% of the weight of the fruit waters; adjusting the calcium ion content to at least 0.01 molar; adding acid to adjust the pH to substantially the point of least solubility of the proteins present; heating the resulting mixture to from 75 to 100° C. to coagulate the proteins and vitamins; and separating the formed coagulum.

References Cited in the file of this patent
UNITED STATES PATENTS

| Number | Name | Date |
|---|---|---|
| 254,239 | Roat | Feb. 28, 1882 |
| 493,689 | Dubiel | Mar. 21, 1893 |
| 668,427 | Uhland | Feb. 19, 1901 |
| 755,479 | Goldschmidt | Mar. 22, 1904 |
| 810,996 | Suzuki | Jan. 30, 1906 |
| 1,735,976 | Riemann | Nov. 19, 1929 |
| 2,001,925 | Thurber | May 21, 1935 |
| 2,075,511 | Baufre | Mar. 30, 1937 |
| 2,149,802 | Thurber | Mar. 7, 1939 |
| 2,443,897 | Dexter | June 22, 1948 |
| 2,594,308 | Heisler | Apr. 29, 1952 |